United States Patent Office 3,629,277
Patented Dec. 21, 1971

3,629,277
S-(1H-1,2,4-TRIAZOL-5-YL) DITHIOCARBAMATES
John J. D'Amico, Dunbar, W. Va., assignor to Monsanto Company, St. Louis, Mo.
No Drawing. Application Oct. 11, 1967, Ser. No. 705,572, now Patent No. 3,454,572, dated July 8, 1969, which is a division of application Ser. No. 513,558, Dec. 13, 1965, now Patent No. 3,379,700. Divided and this application Oct. 1, 1968, Ser. No. 766,027
Int. Cl. C07d 55/06, 99/02
U.S. Cl. 260—308 R
5 Claims

ABSTRACT OF THE DISCLOSURE

S-(1H)-1,2,4-triazol - 5 - yl)dithiocarbamates are described which are useful for accelerating vulcanization of rubber.

---

This application is a division of application Ser. No. 705,572, filed Oct. 11, 1967 now U.S. 3,454,572, which is a division of Ser. No. 513,558, filed Dec. 13, 1965, now U.S. Pat. 3,379,700.

This invention relates to derivatives of 1H-1,2,4-triazole. The invention further relates to new chemical compounds useful as vulcanization accelerators in rubber.

An object of this invention is to provide new and useful chemical compounds for industry. A further object of this invention is to promote the progress of science and useful arts. Other objects will become apparent as the description proceeds.

The new compounds of the invention may be represented by the formula

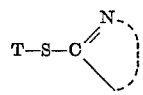

In general, T is a radical having carbon attached to the sulfur shown, which carbon in turn is either singly or doubly linked to nitrogen. T may be thiocarbamoyl. More particularly, T may be

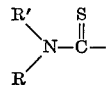

wherein R and R' are lower alkyl, lower cycloalkyl, aryl preferably of the benzene series, or R and R' taken together are an open chain radical which with the nitrogen constitutes a heterocyclic ring which preferably contains at least five members, at least four of which are carbon and not more than one is nitrogen. For example, where the radical

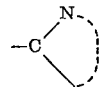

is 1H-1,2,4-triazol-5-yl, T may be N-alkyl-N-aryl thiocarbamoyl, N,N - (oxapentamethylene)thiocarbamoyl, N,N-diloweralkylthiocarbamoyl, or N,N-hexamethylenethiocarbamoyl. In this invention, the term "lower" includes 1 to 8 carbon atoms.

Suitable examples of the compounds of this invention

S-(1H-1,2,4-triazol-5-yl)N,N-dipropyldithiocarbamate,
1-(1H-1,2,4-triazol-5-yl)N-ethyl-N-cyclohexyldithiocarbamate,
S-(1H-1,2,4-triazol-5-yl)N,N-dibutyldithiocarbamate,
S-(1H-1,2,4-triazol-5-yl)N,N-diethyldithiocarbamate,
S-(1H-1,2,4-triazol-5-yl)N-ethyldithiocarbanilate,
S-(1H-1,2,4-triazol-5-yl)N,N-3-oxapentamethylenedithiocarbamate,
S-(1H-1,2,4-triazol-5-yl)N,N-tetramethylenedithiocarbamate,
S1(1H-1,2,4-triazol-5-yl)N,N-pentamethylenedithiocarbamate,
S-(1H-1,2,4-triazol-5-yl)N,N-hexamethylenedithiocarbamate,
S-(1H-1,2,4-triazol-5-yl)N,N-dimethyldithiocarbamate, and
S-(1H-1,2,4-triazol-5-yl)N,N-diisopropyldithiocarbamate.

The new compounds of this invention are prepared as follows:

The compound S-(1H-1,2,4-triazol-5-yl)N,N-dipropyldithiocarbamate is prepared by heating at 55°–56° C. for 30 minutes a charge containing 40.4 grams (0.4 mole) of 1,2,4-triazole-5-thiol, 800 ml. of acetone, and 25.2 grams (0.4 mole) of 90% potassium hydroxide. After cooling to 25° C., 71.6 grams (0.4 mole) of dipropylthiocarbonyl chloride is added in one portion. The stirred mixture is heated at 55°–56° C. for five hours and then filtered hot to remove the potassium chloride. The filtrate is added to 2000 grams of ice water and stirred at 0°–10° C. for one hour. The precipitate is collected by filtration, washed with water until the washings are neutral to litmus, and air dried at 25°–30° C. The product, melting point 90°–95° C., is obtained in a 65.5% yield. After recrystallization from ethyl acetate, a sample of the product melts at 117°–119° C. Analysis of the S-(1H-1,2,4-triazol-5-yl)N,N-dipropyldithiocarbamate shows 22.45% nitrogen and 26.31% sulfur. Calculated percentages for $C_9H_{16}N_4S_2$ are 22.93% nitrogen and 26.24% sulfur.

The compound S-(1H-1,2,4-triazol-5-yl)N,N-dibutyldithiocarbamate is prepared by adding 41.6 grams (0.2 mole) of dibutylthiocarbonyl chloride to a stirred solution containing 20.2 grams (0.2 mole) of 1H-1,2,4-triazole-5-thiol, 300 ml. acetone, 20 ml. of water, and 12.6 grams (0.2 mole) of 90% potassium hydroxide, and the mixture is stirred at 25°–30° C. for 24 hours. After the addition of 300 ml. of water and 400 ml. of ethyl ether, the reaction mixture is stirred at 25°–30° C. for 15 minutes. The separated ether layer is washed with water until the washings are neutral to litmus and then dried over sodium sulfate. The ether is removed in vacuo at a maximum temperature of 80°–90° C. at 1–2 mm. Hg. The product, a black-colored liquid, is obtained in a 77% yield. Analysis of the S-(1H-1,2,4 - triazol-5-yl)N,N-dibutyldithiocarbamate shows 20.36% nitrogen. The calculated percentage for $C_{11}H_{20}N_4S_2$ is 20.57% nitrogen.

The compound S-(1H-1,2,4-triazol-5-yl)N,N-diethyldithiocarbamate is prepared in a similar manner as S-(1H-1,2,4-triazol-5-yl)N,N-dipropyldithiocarbamate described above except 60.4 grams (0.4 mole) of diethylthiocarbonyl chloride is used in place of dipropylthiocarbonyl chloride. The product, melting point 158°–161° C., is obtained in a 52% yield. After recrystallization from ethyl alcohol, a sample of the product melts at 172°–173° C. Analysis of the S-(1H-1,2,4-triazol-5-yl)N,N-diethyldithiocarbamate shows 25.41% nitrogen. The calculated percentage for $C_7H_{12}N_4S_2$ is 25.90% nitrogen.

The compound S-(1H-1,2,4-triazol-5-yl)N-ethyldithiocarbanilate is prepared in a similar manner as S-(1H-1,2,4-triazol - 5 - yl)N,N-dipropyldithiocarbamate described above except 80 grams (0.4 mole) of N-ethyl-N-phenyl thiocarbonyl chloride is used in place of dipropylthiocarbonyl chloride. The product, melting point 140°–148° C., is obtained in a 68.5% yield. After recrystallization from ethyl alcohol, a sample of the product melts at 191°–192° C. Analysis of the S-(1H-1,2-triazole-5-yl)N-ethyl dithiocarbanilate shows 20.36% nitrogen. The calculated percentage for $C_{11}H_{12}N_4S_2$ is 21.19% nitrogen. The remaining compounds of this invention are prepared in a similar manner to the preparations described, supra, with comparable results.

The following table illustrates the useful properties of the compounds of this invention as vulcanization accelerators in sulfur vulcanizable rubber. For the rubber stocks tested and described below, as illustrative of the utility, Mooney scorch times are determined by means of a Mooney plastometer. The time $t_5$ represents the time in minutes required for the Mooney reading to rise five points above the minimum viscosity of the rubber. The known accelerators, MBT and Santocure NS, are included in the data for comparison purposes. MBT designates 2-mercaptobenzothiazole, and Santaocure NS is the trademark for N-tert-butyl-2-benzothiazolesulfenamide. The antioxidant Neozone D is included in the stocks. The active ingredient for Neozone D is reported to be N-phenyl-beta naphthyl-amine.

Table I illustrates rubber cure properties of the compounds of this invention in an A–5 masterbatch. An A–5 masterbatch is composed of:

| | Parts |
|---|---|
| Natural rubber smoke sheets | 100 |
| High abrasion furnace black | 50 |
| Zinc oxide | 3.0 |
| Stearic acid | 2.0 |
| Hydrocarbon softener | 3.0 |
| Saturated polymerized petroleum hydrocarbon | 3.0 |

The stock numbers in Table I contain the following compounds:

| Stock: | Compound |
|---|---|
| 1 | Santocure NS. |
| 2 | MBT. |
| 3 | S-(1H-1,2,4-triazol - 5 - yl)N,N-dipropyl-dithiocarbamate. |
| 4 | S-(1H-1,2,4-triazol - 5 - yl)N,N-diethyl-dithiocarbamate. |
| 5 | S-(1H-1,2,4-triazol - 5 - yl)N - ethyl-dithiocarbanilate. |

It is intended to cover all changes and modifications of the examples of the invention herein chosen for purposes of disclosure which do not constitute departures from the spirit and scope of the invention.

I claim:

1. A compound of the formula

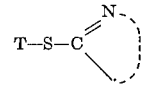

wherein

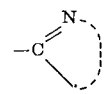

is 1H-1,2,4-triazol-5-yl and wherein T is

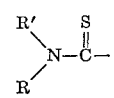

wherein R and R' are independently lower alkyl, lower cycloalkyl, phenyl or taken together with the nitrogen constitute a heterocycle selected from the group consisting of morpholino, piperidino, pyrrolidino and hexamethylenimino.

2. A compound according to claim 1 wherein R and R' are independently lower alkyl.

3. A compound according to claim 1 wherein T is N,N-dipropylthiocarbamoyl.

4. A compound according to claim 1 wherein T is N-ethyl N-phenyl thiocarbamoyl.

5. A compound according to claim 1 wherein T is N,N-diethylthiocarbamoyl.

TABLE I

| | Cure time [1] | Stock | | | | |
|---|---|---|---|---|---|---|
| | | 1 | 2 | 3 | 4 | 5 |
| A-5 Masterbatch | | 161 | 161 | 161 | 161 | 161 |
| Neozone D | | 1.0 | 1.0 | 1.0 | 1.0 | 1.0 |
| Sulfur | | 2.5 | 2.5 | 2.5 | 2.5 | 2.5 |
| Accelerator | | 0.5 | 0.5 | 0.5 | 0.5 | 0.5 |
| Mooney scorch at 135° C., $t_5$ | | 10.0 | 5.1 | 7.4 | 7.3 | 9.6 |
| Stress-strain: | | | | | | |
| Modulus 300, p.s.i. | 45 | 2,680 | 2,200 | 2,170 | 2,170 | 1,810 |
| | 60 | 2,700 | 2,270 | 2,040 | 1,950 | 1,680 |
| Ultimate tensile strength, p.s.i. | 45 | 4,250 | 3,510 | 3,460 | 3,560 | 3,040 |
| | 60 | 4,000 | 3,220 | 3,560 | 2,470 | 2,080 |
| Ultimate elongation, percent | 45 | 450 | 460 | 450 | 480 | 450 |
| | 60 | 430 | 400 | 490 | 360 | 400 |

[1] Minutes at 144° C.

References Cited

UNITED STATES PATENTS 2,187,719  1/1940  Williams _____ 260—239

ALTON D. ROLLINS, Primary Examiner

U.S. Cl. X.R.

260—247.1, 293.4 H